July 15, 1924.

G. H. WRIGHT

SEED PLANTER

Filed April 12, 1923

WITNESSES
Frederick Diehl.
E. W. Savage

INVENTOR
GEORGE H. WRIGHT
BY
ATTORNEYS

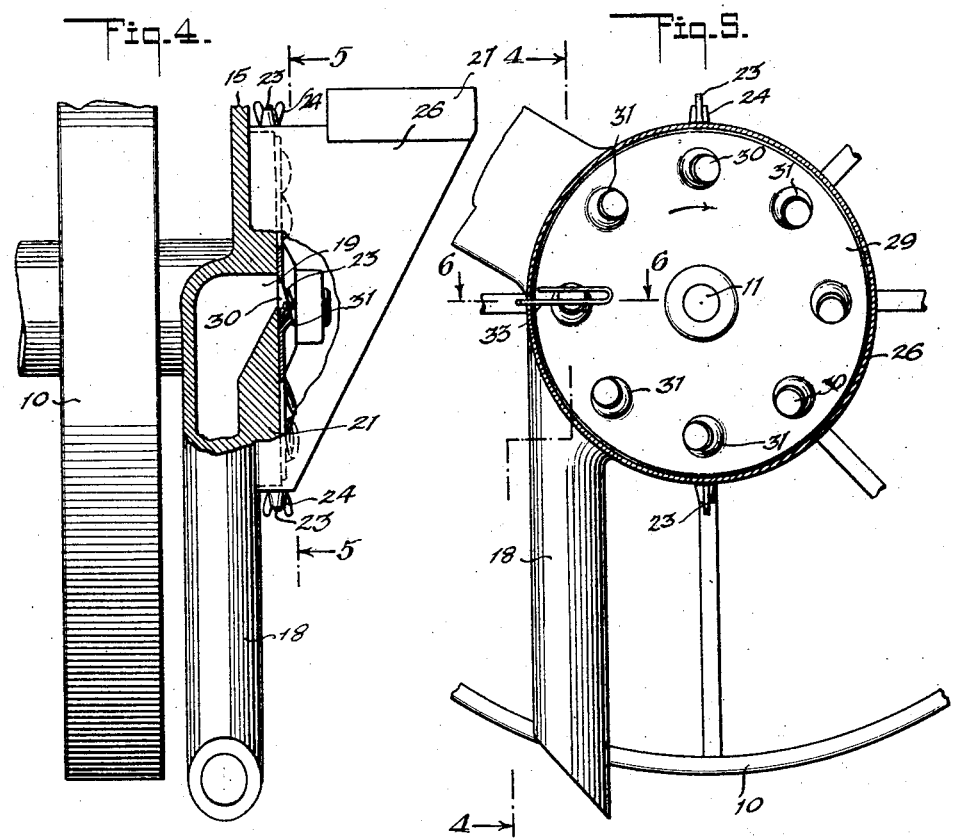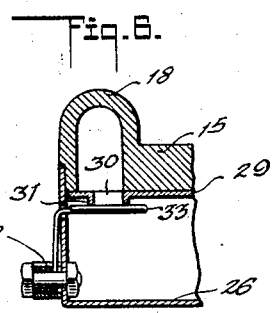

Patented July 15, 1924.

1,501,828

UNITED STATES PATENT OFFICE.

GEORGE HENRY WRIGHT, OF SPOKANE, WASHINGTON.

SEED PLANTER.

Application filed April 12, 1923. Serial No. 631,684.

*To all whom it may concern:*

Be it known that I, GEORGE H. WRIGHT, a citizen of the United States, and a resident of Spokane, in the county of Spokane and State of Washington, have invented new and useful Improvements in Seed Planters, of which the following is a full, clear, and exact description.

This invention relates to seed planters.

The general object of the invention is the provision of a simple and durable seed planter provided with an efficient feeding means for delivering the seed from a seed box to a seed spout.

A further object of the invention is the provision of a seed planter, including a seed spout for dropping the seed, provided with means for covering the seed that has been dropped.

These objects are accomplished by interposing between the feed box and the seed spout a rotatably mounted disk having a plurality of openings therethrough which may be periodically moved into register with the seed spout, and forming on the rotatably mounted disk about the openings buckets having inclined walls that serve to pick up the seed in the seed box and deliver it into the seed tube.

These and other objects of the invention will be more clearly understood from the following detailed description and accompanying drawings.

Figure 4 is a section along the line 4—4, Figure 5, showing a portion of the seed planter cut away to disclose its construction;

Figure 5 is a vertical section along the line 5—5, Figure 4, showing a side elevation of the seed feeding mechanism;

Figure 6 is a section on the line 6—6, Figure 5, showing the spring provided to act as a wiping member.

Figures 1, 2, 3:
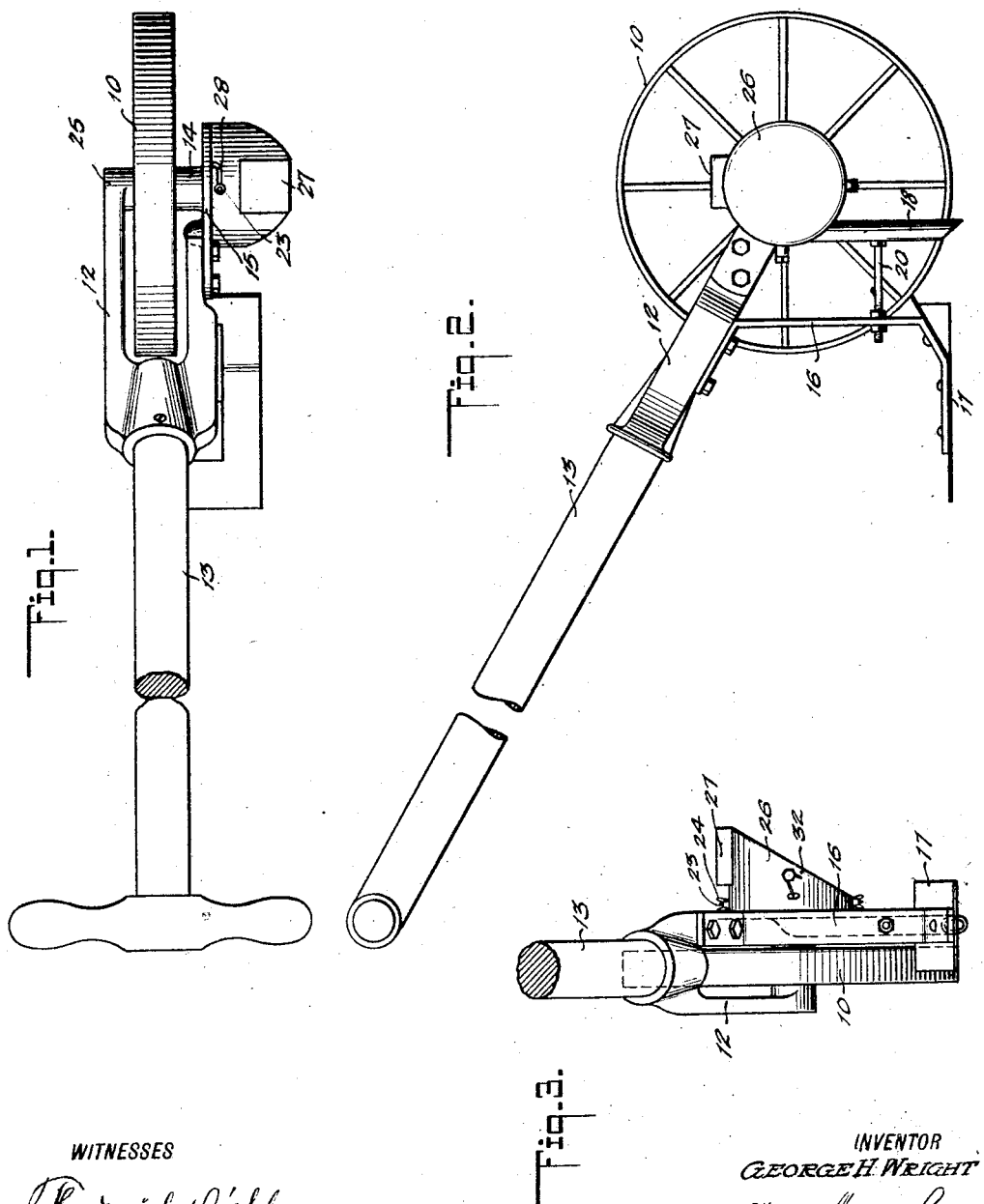
Figure 1 is a top plan view of the seed planter.
Figure 2 is a side elevation of the seed planter.
Figure 3 is a rear elevation of the seed planter.

Referring to the above-mentioned drawings, the seed planter includes a pilot wheel 10 provided with trunnions 11 extending on opposite sides. A U-shaped frame 12 has formed on the lower end of one arm a bearing 25 for receiving one of the trunnions 11 provided on the pilot wheel. Mounted in the upper end of the U-shaped frame 12 is a handle 13 for pushing the seed planter. A hub 14 having a flange 15 formed on one end has a bearing formed therein for receiving the other trunnion 11. The flange 15 is bolted to one of the arms of the U-shaped frame 12. Thus the pilot wheel 10 is retained in position in the U-shaped frame, serving to support the latter.

A seed tube 18 depends from the flange 15 and the opening in the seed tube is located in alinement with an opening 19 extending through the flange 15. This seed tube 18 is connected to a bracket 16 depending from the U-shaped frame 12 by a rigid link 20 thus increasing the rigidity of the seed tube. The bracket 16 is located in alinement with the tube 18 and in the rear. This bracket carries a shoe 17 which, when the planter is set in motion, follows the tube 18, serving to cover the seeds dropped through the tube.

A portion of the flange 15 is cut away forming a shoulder 21. A plurality of threaded studs 23 are mounted in this shoulder and project outward. These studs are provided for attaching a seed box 26 to the shoulder 21. The seed box is provided with bayonet slots 28 which fit over the studs 23. Wing nuts 24 are then mounted on the studs for engaging the seed box to retain it in position on the studs. A door 27 is provided in the top of the seed box 26 so that seeds may be introduced into the latter. As shown in Figure 4, the outer wall of the seed box inclines inward toward the bottom so as to carry the seeds toward the feeding mechanism as they slide downward.

The feeding mechanism includes a disk 29 fixed to the end of the trunnion 11 which extends through the hub 14. A plurality of openings 30 are formed in the disk 29 and so located that they periodically register with the opening 19 upon the rotation of the disk. Encircling each opening 30 is a wall forming a bucket 31. The edges of these walls slope upward from the plane of the disk 29 while the walls themselves are inclined at an angle to the plane of the disk. This incline of the bucket walls is such that when the openings 30 aline with the opening 19 the walls incline downward toward the tube, allowing the seeds under the force of gravity to slide into the opening 19. A spring 32 is mounted on the seed box and carries a finger 33 which projects into the seed box and is so located that it wipes the buckets 31 upon the rotation of the disk 29.

The operation of this device is as follows: After the seed box 26 has been filled with seed the planter is set in operation by the pushing of it along the trench or over the ground where it is desired to drop the seed. As the pilot wheel 10 rotates it rotates the disk 29 in the direction of the arrow shown in Figure 5. The buckets 31 pick up the seed in the seed box 26, carry it upward and deliver it into the opening 19 from whence it passes into the tube 18. As the disk 29 rotates, the finger 33 wipes the buckets 31, preventing the possibility of the seeds clogging the buckets. Since the edges of the buckets slope upward from the plane of the plate it permits the wiping finger to pass over without sticking. The inclined walls of the buckets allow the finger 33 to slide over them when the direction of rotation of the pilot wheel is reversed.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In a seed planter, a seed dispensing plate comprising a disk having a plurality of openings extending therethrough, said openings being located in circular arrangement in the disk, and buckets integral with the disk, said buckets projecting from the disk and partially encircling said openings, the edge of the bucket wall sloping upward from the plane of the disk, said bucket wall being inclined to the plane of the disk.

2. In a seed planter including a seed spout and a seed box, a seed feeding mechanism for delivering the seeds from the seed box to the seed spout, comprising a disk rotatably mounted in the seed box, said disk having a plurality of openings extending therethrough, said openings being located in circular arrangement, and buckets integral with and projecting from said disk and partially encircling the disk openings, said buckets serving to pick up the seed in the seed box and deliver it to the seed spout, and a spring member in the seed box and engaging and wiping the buckets.

GEORGE HENRY WRIGHT.